United States Patent [19]

Brooke et al.

[11] 4,041,673
[45] Aug. 16, 1977

[54] METHOD AND APPARATUS FOR FLATTENING AND SEALING POUCH TOPS

[75] Inventors: Arthur Alan Brooke, Toronto; Rudy Loben, Westhill, both of Canada

[73] Assignee: Delamere & Williams Company Limited, Toronto, Canada

[21] Appl. No.: 602,219

[22] Filed: Aug. 6, 1975

[51] Int. Cl.² .................................................. B65B 7/06
[52] U.S. Cl. ........................................... 53/39; 53/44; 53/371; 53/373
[58] Field of Search .................. 53/38, 39, 44, 183, 53/187, 371, 373

[56] References Cited

U.S. PATENT DOCUMENTS

| | | | |
|---|---|---|---|
| 2,277,289 | 3/1942 | Bergstein et al. | 53/39 X |
| 2,691,857 | 10/1954 | Harker | 53/373 |
| 2,913,862 | 11/1959 | Sabee | 53/180 X |
| 3,381,446 | 5/1968 | Marchand | 53/187 |
| 3,381,448 | 5/1968 | Ayres et al. | 53/373 |
| 3,545,166 | 12/1970 | Johnson et al. | 53/183 X |
| 3,559,372 | 2/1971 | Cerioni | 53/371 X |
| 3,606,727 | 9/1971 | Davis | 53/373 X |
| 3,720,565 | 3/1973 | Cavanna | 53/373 X |

*Primary Examiner*—Robert Louis Spruill
*Attorney, Agent, or Firm*—Dike, Bronstein, Roberts, Cushman & Pfund

[57] ABSTRACT

Apparatus for flattening and sealing the mouth of a filled pouch, comprising clamping jaws and coacting gripping rolls arranged to simultaneously grasp the leading and trailing ends at the mouth of a pouch moving along a predetermined path towards sealing rolls for pulling the leading and trailing ends in opposite directions so as to straighten the edges at the mouth and a jet heater situated between the gripping rolls and the sealing rolls for rendering the smoothly straightened edges adhesive while traveling therebetween. The sealing rolls simultaneously squeeze the adhesive edges and chill them to effect a seal. There are belts having spaced parallel runs extending from the coacting gripping rolls to the sealing rolls for gripping the sides of the pouch below the smoothly straightened edges to hold the latter flat as the pouch travels from the gripping rolls through the jet heater to the sealing rolls.

25 Claims, 21 Drawing Figures

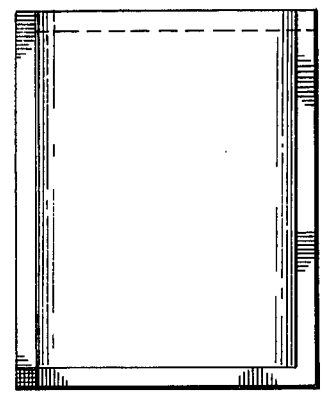
Fig. 1-a
Fig. 1-b
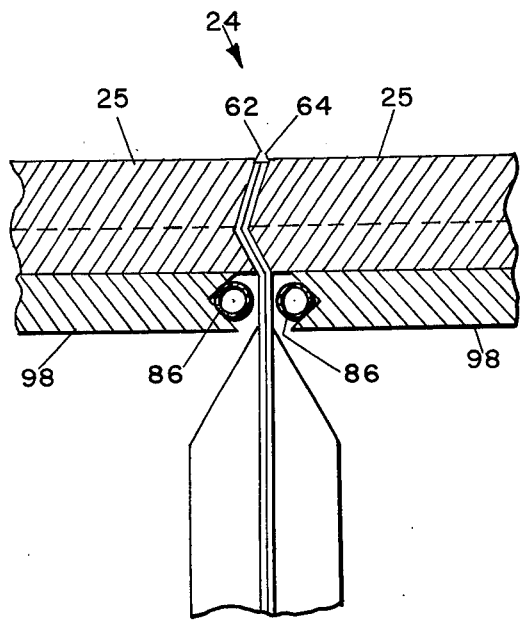
Fig. 10-a
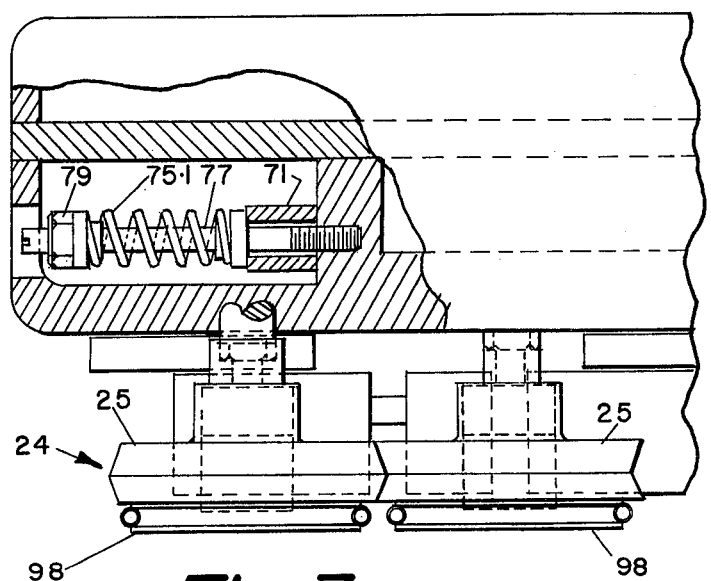
Fig. 3-a

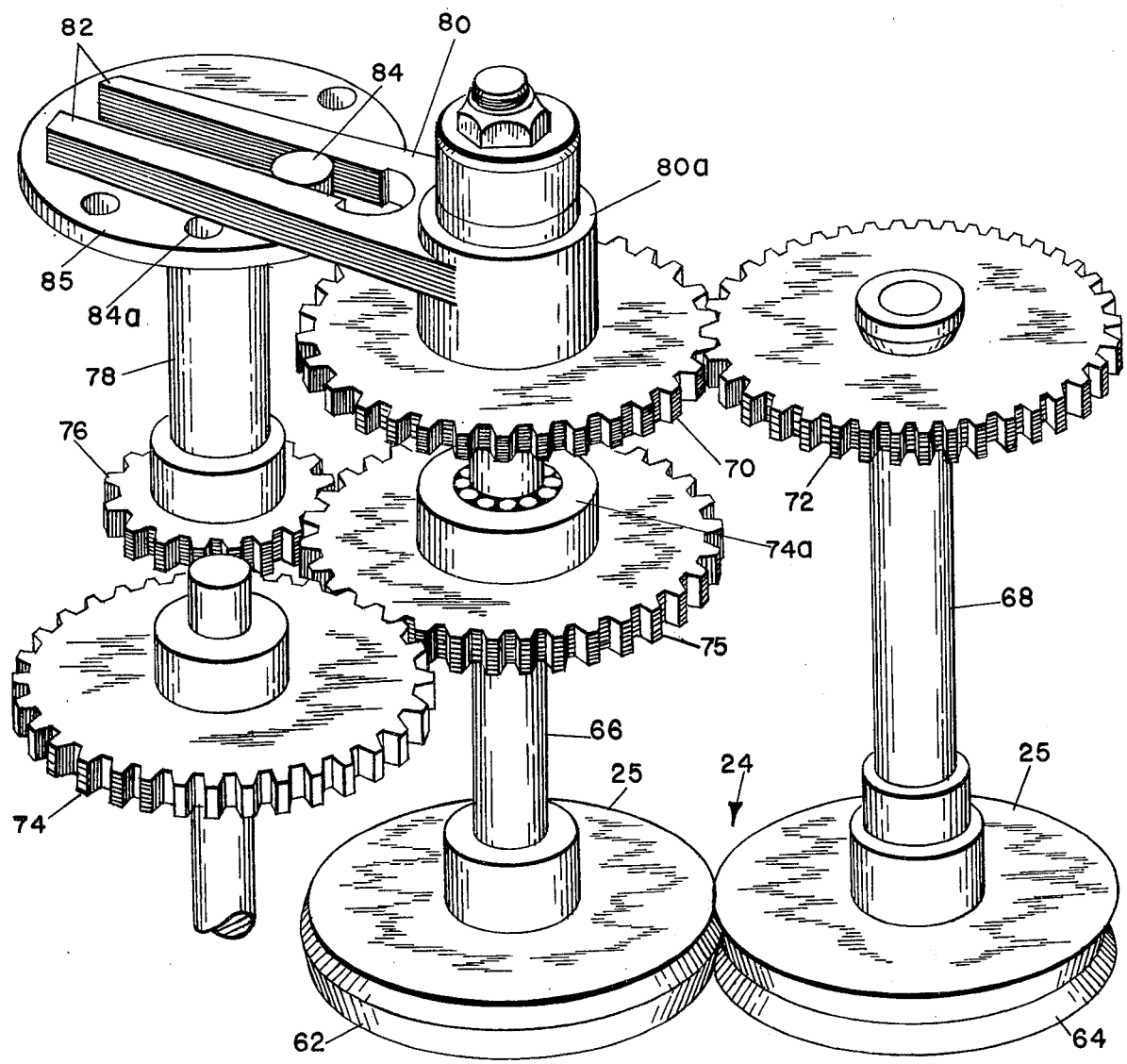
Fig.4-a

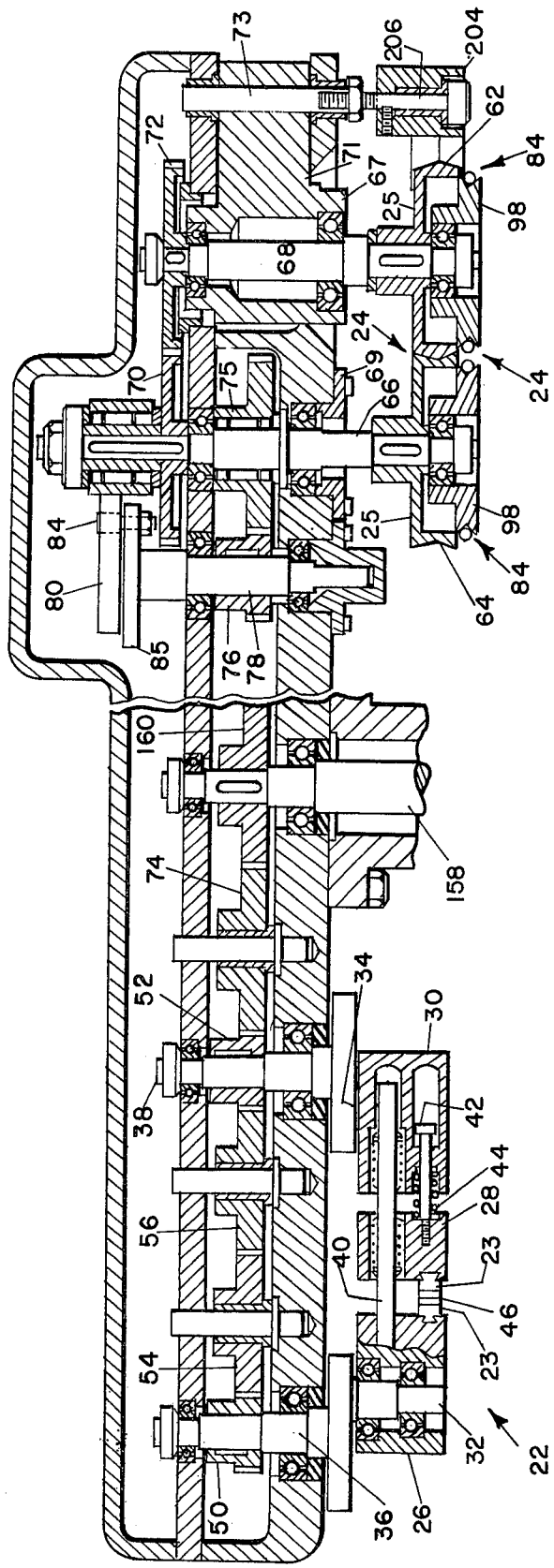
Fig. 4-b

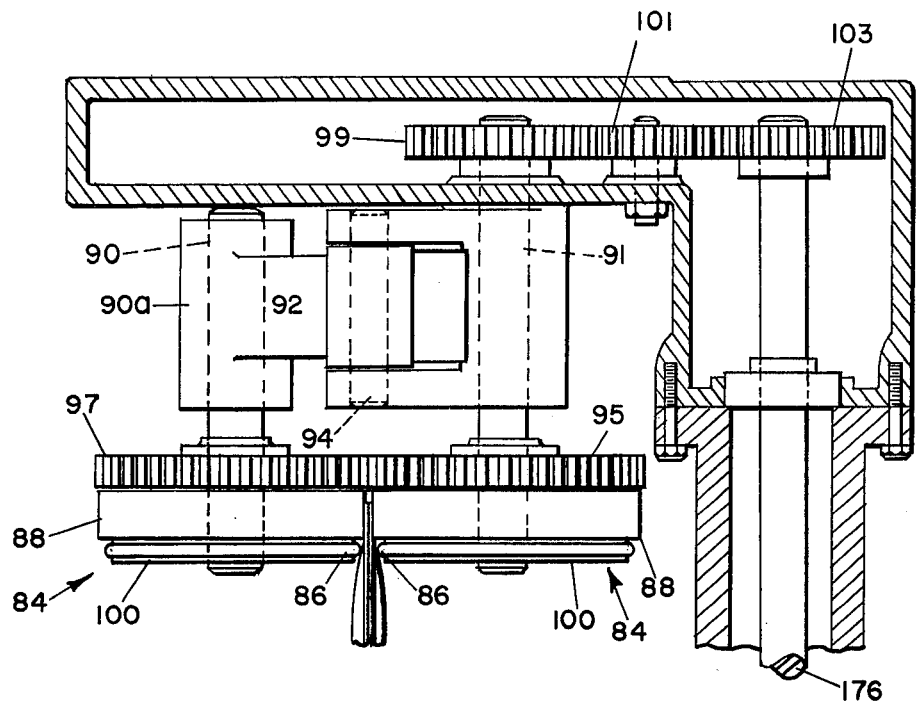
Fig. 4-c

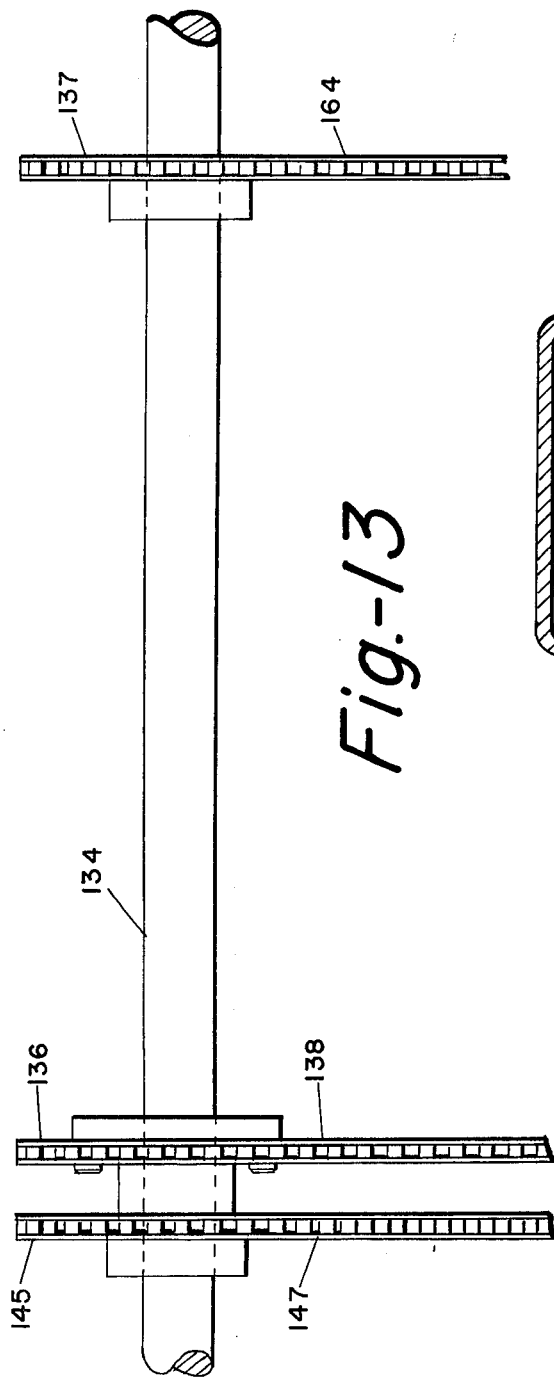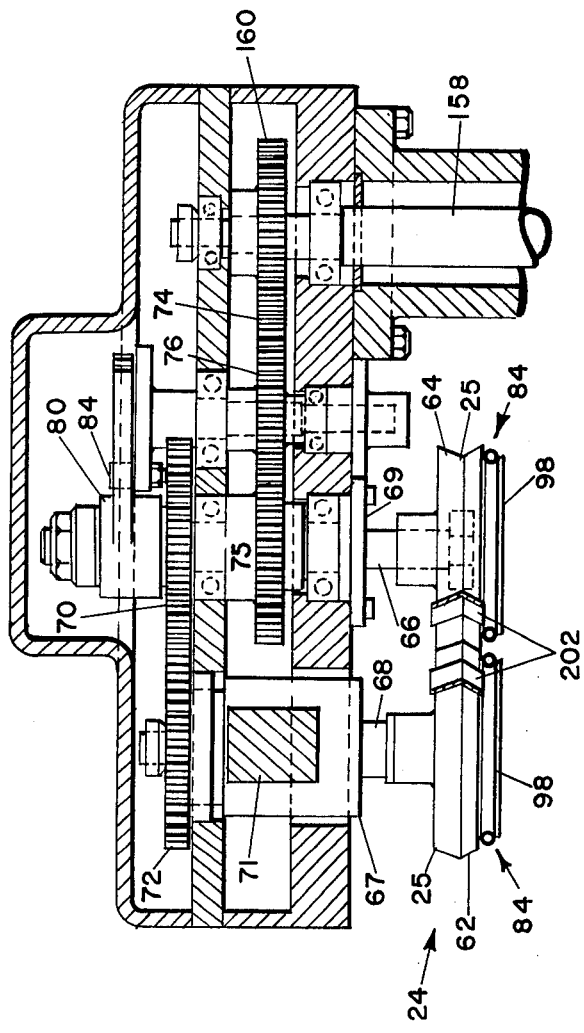

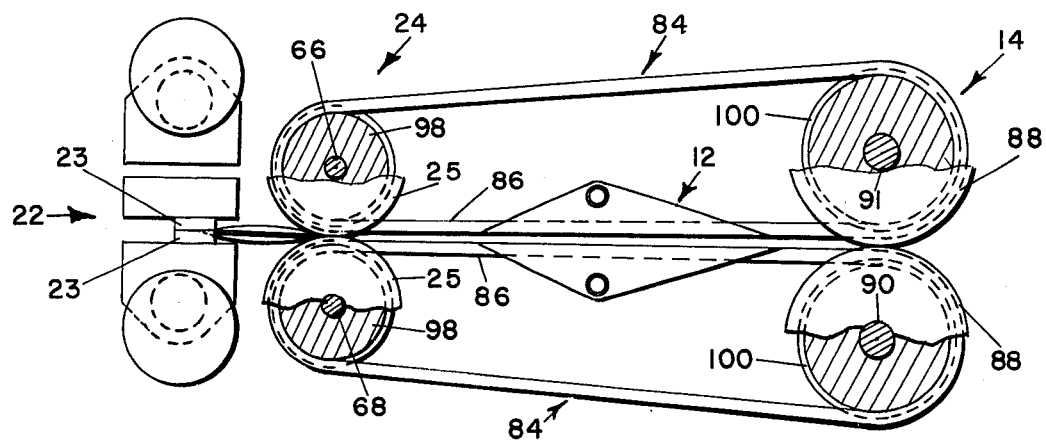
Fig. 10
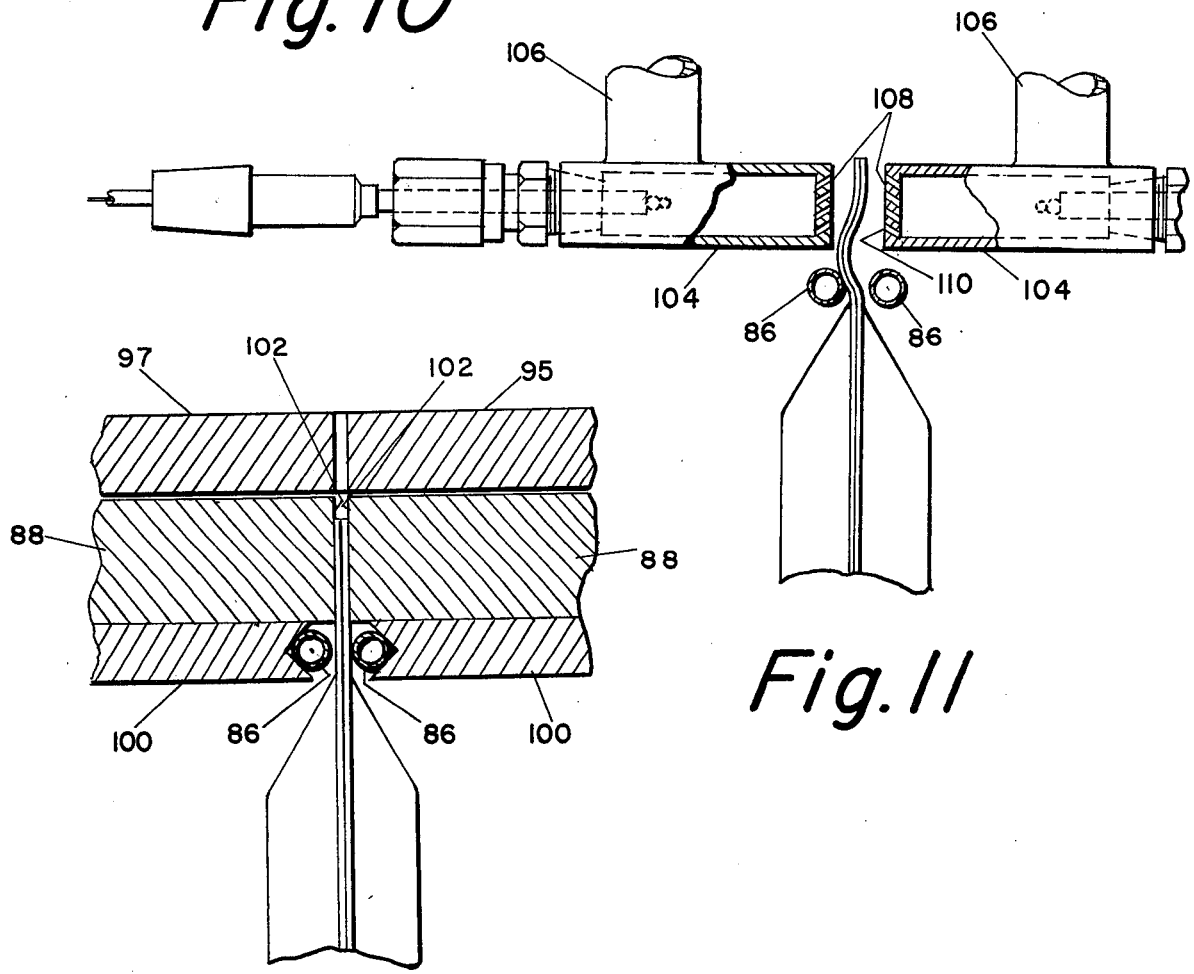
Fig. 11
Fig. 12

METHOD AND APPARATUS FOR FLATTENING AND SEALING POUCH TOPS

BACKGROUND OF INVENTION

An apparatus for flattening the upper edges of a pouch or packet preparatory to sealing is disclosed in U.S. Pat. No. 2,913,862 wherein the pouches while traveling along a predetermined path at a predetermined speed are flattened by mechanism which includes a pair of jaws which clamp the trailing ends of the pouches and a pair of coacting gripping rolls which grip the leading ends. The jaws which clamp the trailing ends move at the same speed as the conveyor carrying the pouches along the path of movement and the coacting gripping rolls rotate at a faster rate than the conveyor to pull the leading ends of the pouches forwardly relative to the fixed trailing ends of the pouches thus to flatten the upper edges. Since the body portions of the pouches are confined, pulling the leading ends at the mouths forwardly tends to stretch and produce diagonal distortion of the pouches. The apparatus as herein disclosed is designed to effect straightening of the edge portions without distortion and further to hold the straightened edge portions once they have been straightened intimately engaged until sealed and to heating the edge portions to render them adhesive for sealing without damaging the edge portions or the body portions therebelow.

SUMMARY OF THE INVENTION

As herein illustrated the apparatus comprises means for moving filled pouches standing upright along a predetermined path at a predetermined rate, straightening instrumentalities and sealing means situated along said path for straightening the upper edges of the pouches smoothly flat, and means intermediate the straightening instrumentalities and sealing means for rendering the flattened edges adhesive preparatory to sealing, charcterized in that the straightening instrumentalities operate while the pouches are moving forwardly uninterruptedly at said predetermined rate toward the sealing means to straighten the edges in opposite directions by applying a retarding force to the trailing end and an accelerating force to the leading end. The straightening instrumentalities comprise clamping jaws and coacting gripping rolls arranged to simultaneously grasp the trailing and leading ends of the pouch at the mouth, means for moving the clamping jaws forwardly in the direction of movement but at a slower speed than the forward movement and means for accelerating rate of rotation of the coacting gripping rolls at a rate faster than the rate of forward movement. The gripping rolls also operate to crimp the upper edges of the pouches. Between the straightening instrumentalities and the sealing means there is heating means for rendering the flattened edges adhesive which projects hot air against the opposite sides and upwardly relative to the body of the pouch. At the place of sealing there is a pair of coacting smooth face rolls which squeeze the adhesive edges together, remove the crimp and chill the heated edges so as to form a seal at the top.

The invention will now be described in detail with reference to the accompanying drawings, wherein:

FIG. 1a is an elevation of a pouch of the kind to be sealed;

FIG. 1b is a top view of the open mouth of the pouch;

FIG. 3a is a fragmentary view partly in section showing the means for yieldingly holding the coacting gripping rolls engaged;

FIG. 4a is a perspective to much larger scale of the gearing shown in plan view in FIG. 3;

FIG. 4b is a vertical section taken on the line 4b—4b of FIG. 3;

FIG. 4c is a vertical section taken on the line 4c—4c of FIG. 3;

FIG. 5 is a section taken on the line 5—5 of FIG. 3;

FIGS. 6, 7, 8, 9 and 10 are plan views of the straightening instrumentalities, including the clamping jaws, coacting gripping rolls, heating means and sealing means showing the cyclical movement of the clamping jaws relative to the gripping rolls during the forward movement of the pouch and straightening of the mouth of the pouch to bring the edges into engagement;

FIG. 10a is a fragmentary vertical section taken on the line 10a—10a of FIG. 3;

FIG. 11 is a fragmentary elevation to larger scale and partly in section taken on the line 11—11 of FIG. 3;

FIG. 12 is a fragmentary vertical section to larger scale taken on the line 12—12 of FIG. 3;

FIG. 13 is a plan view showing the drive from the main drive shaft; and

Figure 1:
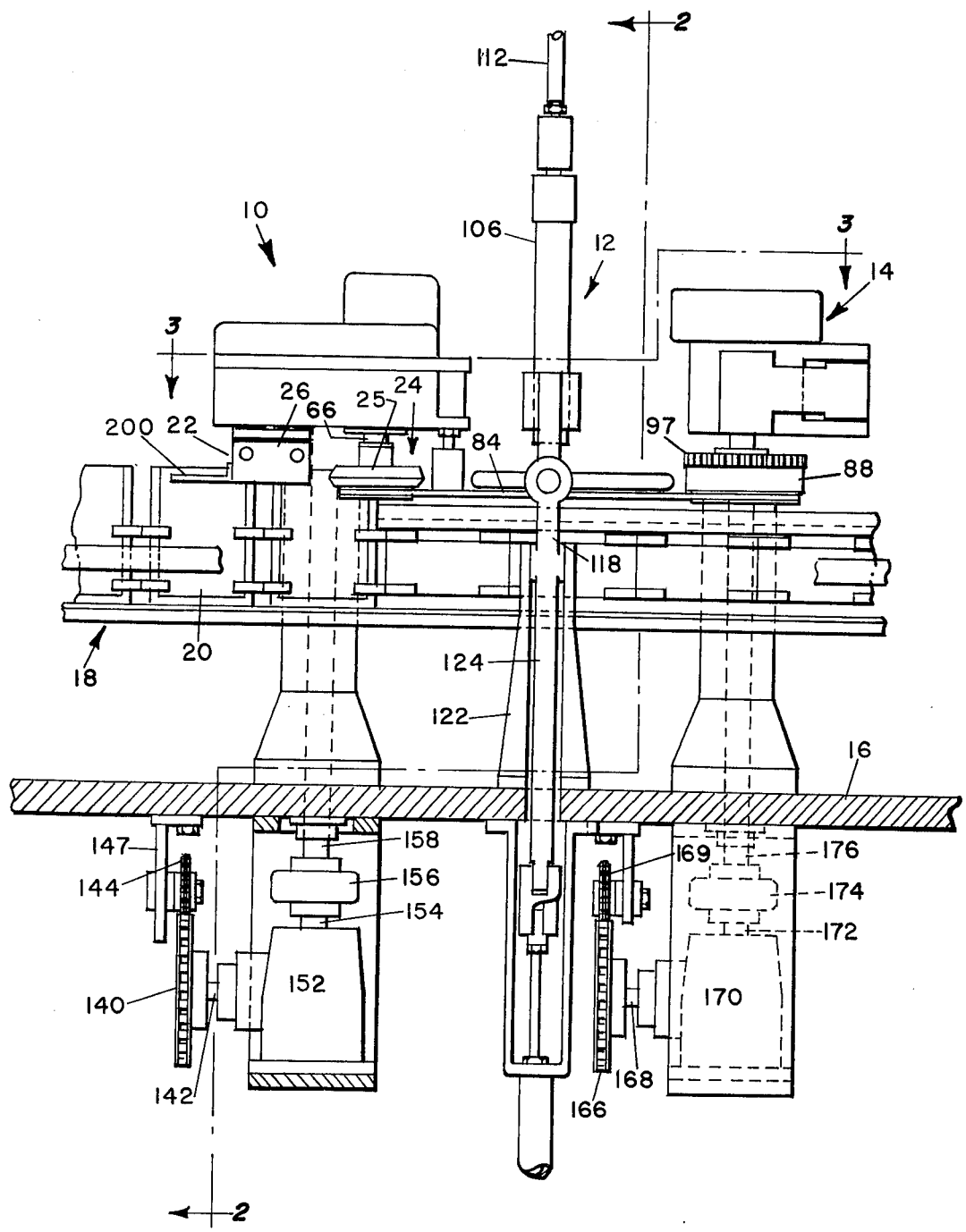
FIG. 1 is a side elevation of the machine with portions of the base broken away.

Referring to the drawings, FIG. 1, the apparatus comprises straightening instrumentalities 10 which include a clamping assembly and coacting gripping means; heating means 12 and sealing means 14 assembled in-line on a supporting platform 16 comprising the upper part of a base which is supported from the floor, beneath which is drive mechanism for effecting operation of the straightening instrumentalities and sealing means.

A pouch of the kind to be sealed is illustrated in FIGS. 1a and 1b. The aforesaid instrumentalities are designed to close and flatten the upper edge portions for sealing and to this end the pouches are supplied to the apparatus and moved along with their open upper ends at a level to be operated on by the straightening instrumentalities, heating means and sealing means on a conveyor 18, FIGS. 1 and 2, comprising an endless chain movable about longitudinally spaced sprockets 19—19, FIG. 14, with one run traveling along a line X—X, FIG. 3, at the opposite sides of which are spaced the straightening instrumentalities, heating means and sealing means. The conveyor chain has at uniformly spaced intervals pockets 20 within which the pouches are disposed upright with their open upper ends up.

Figure 2:
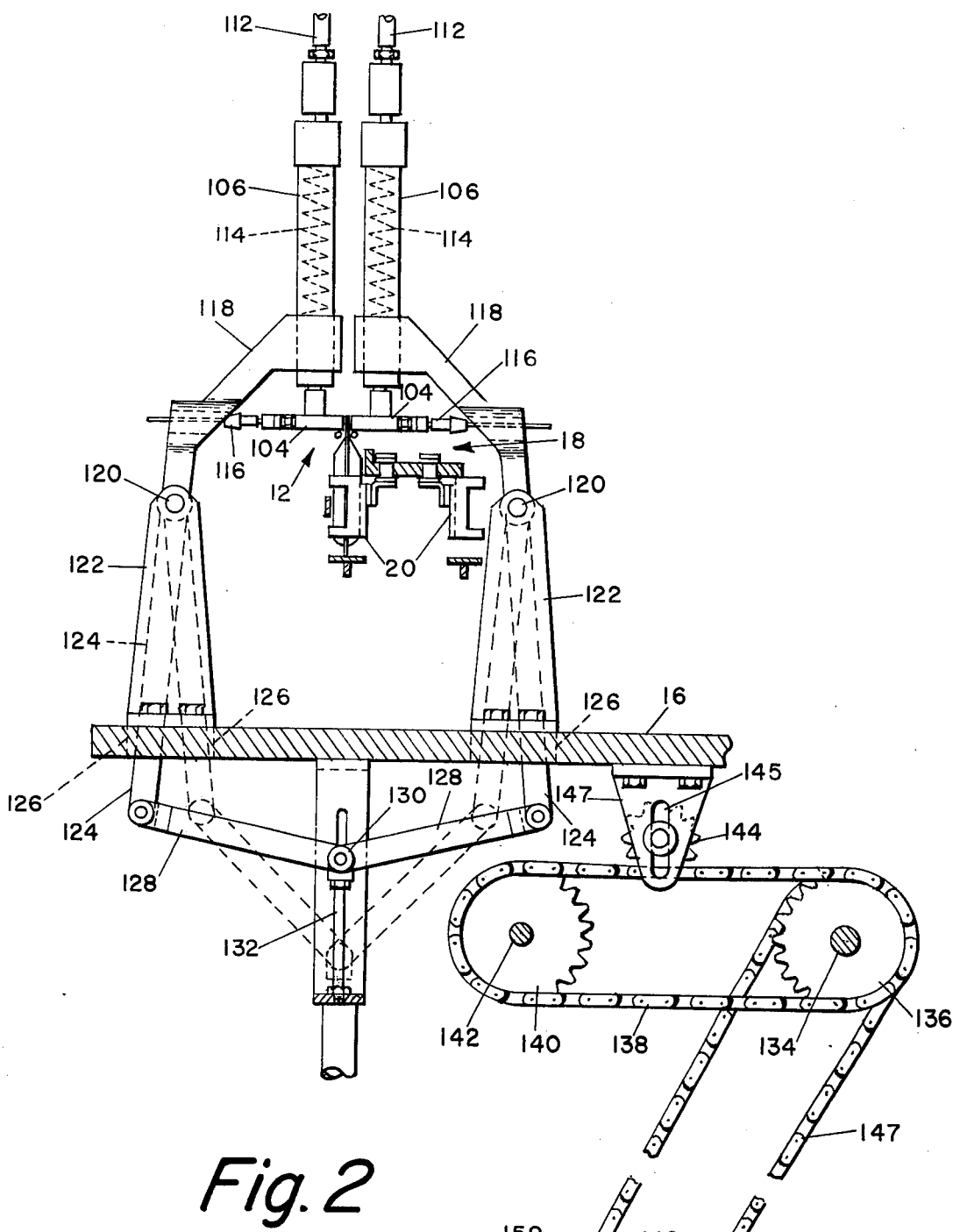
FIG. 2 is a vertical elevation taken on the line 2—2 of FIG. 1.
Figure 4:
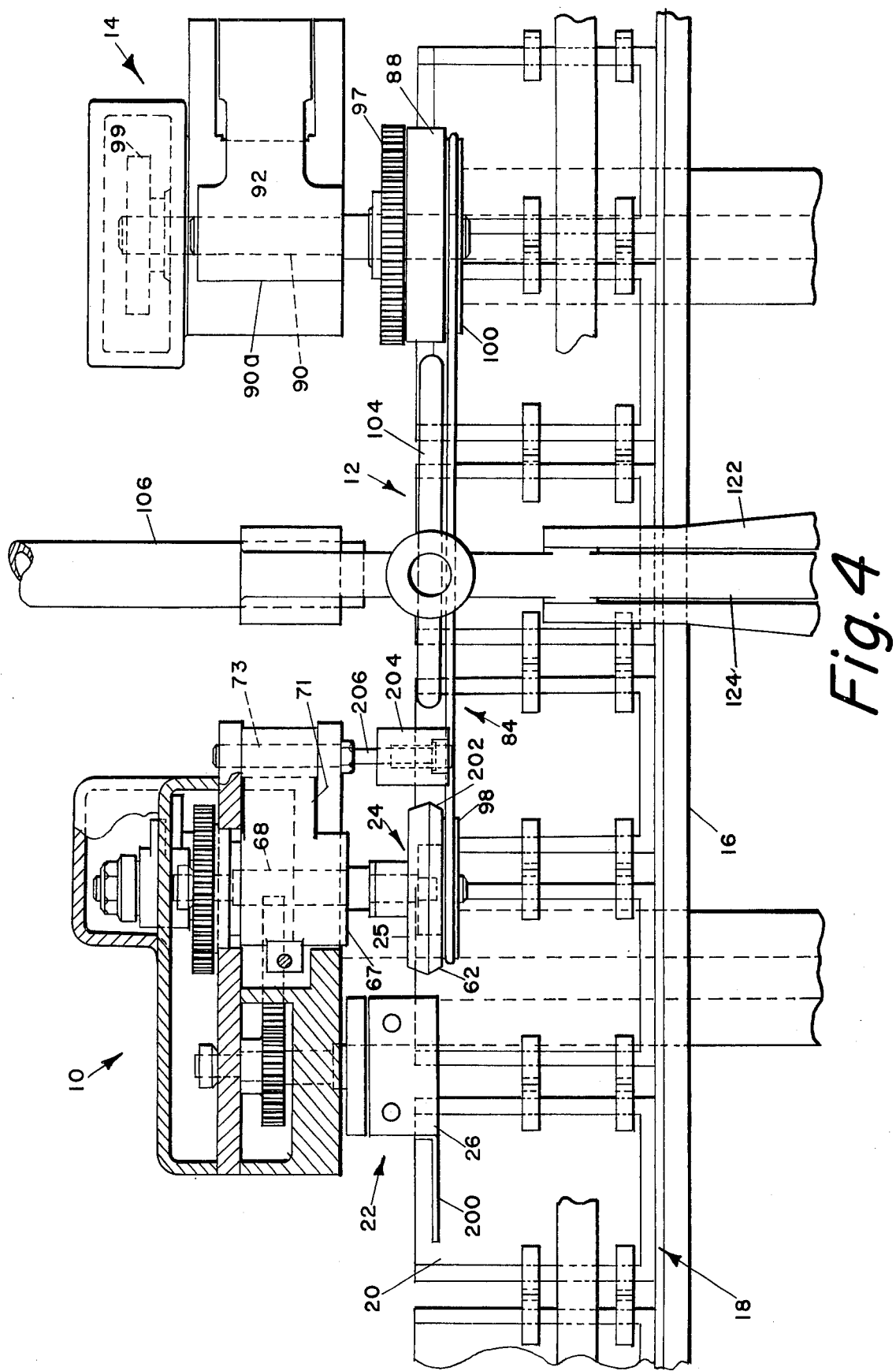
FIG. 4 is an elevation partly in section taken on the line 4—4 of FIG. 3.
Figure 6:
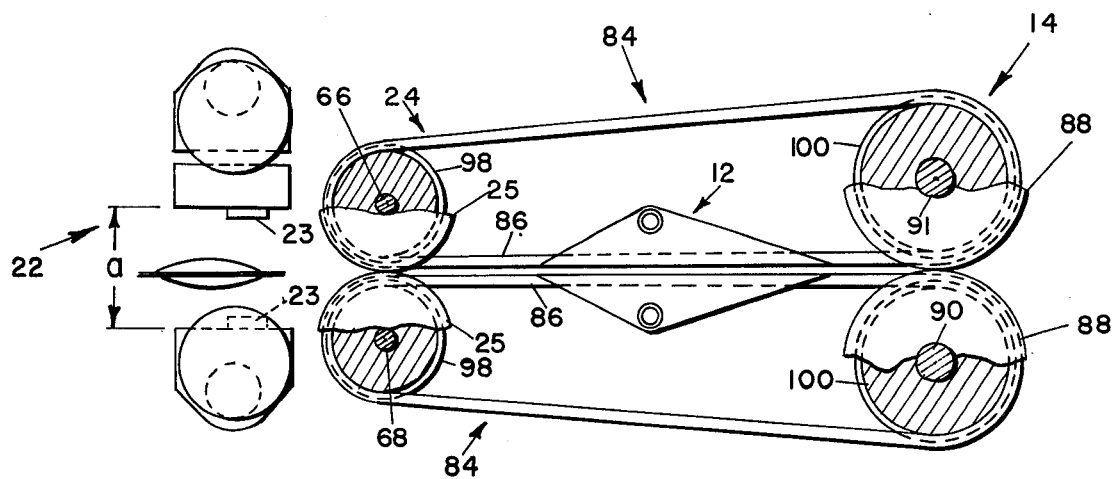
Figure 7:
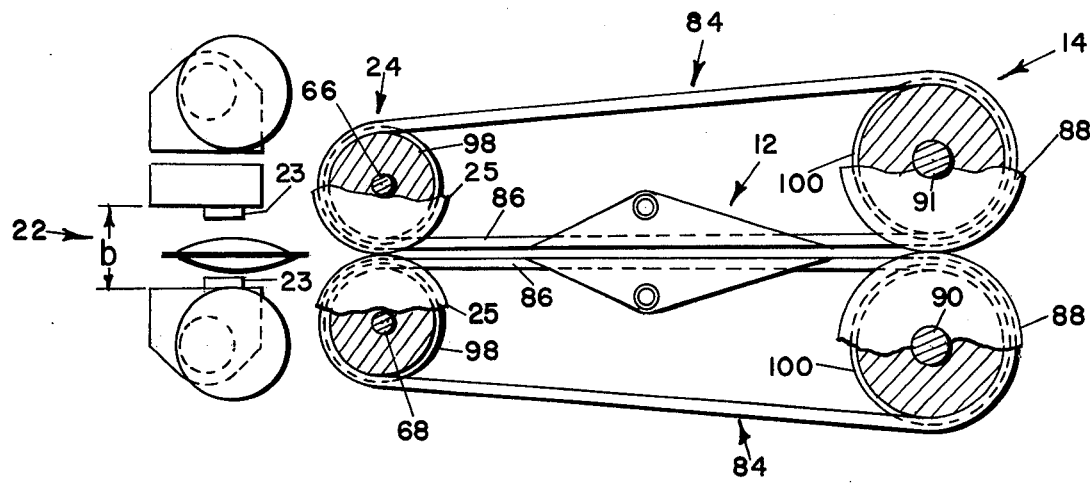

The straightening instrumentalities 10, as previously related, include a clamping assembly 22 and coacting gripping means 24, FIGS. 1, 2 and 4, located adjacent the path of movement of the conveyor pockets. The clamping assembly comprises jaws 23—23 and the coacting gripping means comprise rotating disks 25—25 arranged and operated so that as a pouch begins to move between the jaws 23—23 towards the rotating disks 25—25 the jaws progressively come together, as shown sequentially in FIGS. 6, 7, 8 and 9. At the moment the leading end of the pouch enters the bite between the rotating disks 25—25 the jaws 23—23 take hold of the trailing end of the pouch and as the cycle continues, as shown in FIG. 10, the mouth of the pouch is straightened between the jaws 23—23 and the rotating disks 25—25 to flatten the edges and remove any wrinkles so that the edges will be ready for sealing.

As was related above, the apparatus shown in the aforesaid patent is also designed to straighten the mouth of a pouch to flatten it for sealing. The stretch is applied by holding one end fixed and pulling the other relative to the fixed end so that the stretch takes place in one direction with respect to the vertical centerline of the pouch. The apparatus of this invention is designed to take hold of both the trailing and leading ends and the simultaneously pull the two ends in opposite directions while continuing to move the pouch forwardly, the effect of which is to straighten and flatten the edges without shifting the pouch bodily in the carrier and/or producing diagonal stretching and distortion.

Referring specifically to FIG. 4b, the clamping assembly 22 comprises at one side a block 26 and at the other side two blocks 28 and 30. The blocks 26 and 30 are supported on eccentrically mounted pins 32 and 34 at the lower ends of vertically mounted shafts 36 and 38 and the block 28 is mounted between the blocks 26 and 30 on spaced parallel guide rods 40—40 slidably mounted within openings within the blocks so as to permit the blocks to be oscillated toward and from each other by rotation of the eccentric pins. The block 28 is held yieldably distended from the block 30 by means of a pin 42 fixed at one end in the block 28 and slidable at the other end within an opening in the block 30 about which there is mounted a coiled spring 44 with one end abutting the block 28 and the other recessed into the block 30. In the distended position of the block 28 there is a gap 46 between the block 26 and the block 28 and within the gap are the jaws 23—23 which are recessed into the confronting faces of the blocks 26 and 28.

Figure 8:
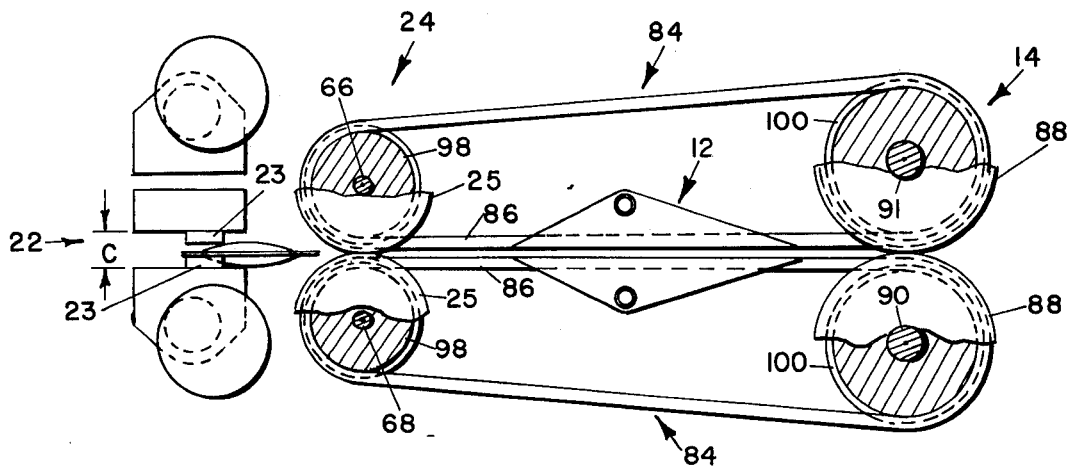
Figure 9:
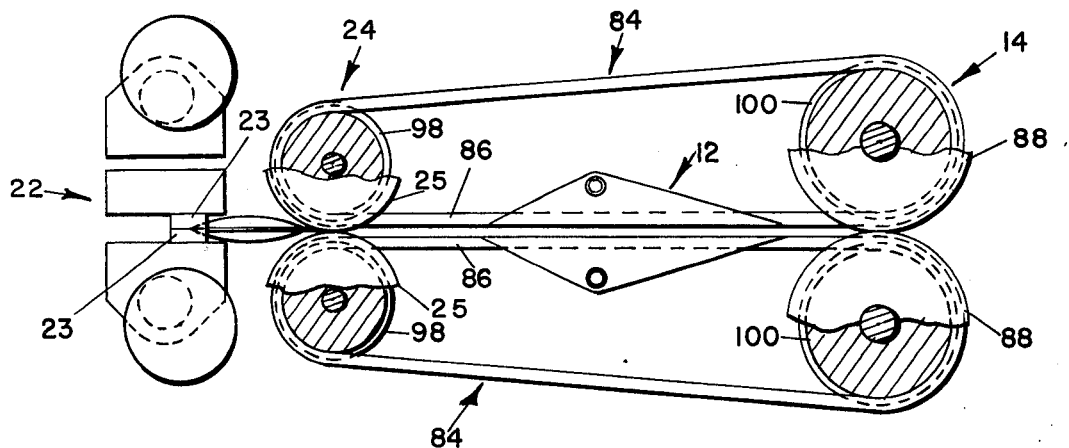

The shafts 36 and 38 are supported in suitable bearings on the machine frame and have fixed thereto spur gears 50 and 52 which are interconnected so as to rotate at the same speed by a pair of idlers 54, 56 which mesh respectively with the spur gears 50 and 52 and with each other. As thus constructed, rotation of the aforesaid gears will rotate the eccentric pins 32 and 34 to cause the jaws to move from an initial spacing a, FIG. 6, as a pouch begins to enter the space between the jaws to an intermediate spacing b, FIG. 7, as the pouch passes between the jaws and from there to a near closing position c, as shown in FIG. 8, in which position the leading end is approximately at the bite of the rotating disks and the trailing end substantially at the bite of the jaws. FIG. 9 shows the actual gripping of the leading end of the pouch between the rotating disks and the jaws and FIG. 10 shows the pulling of the mouth of the pouch in opposite directions produced during continuous forward movement of the pouches by acceleration of the rotating disks and a retardation of forward movement of the jaws.

Forward movement of the jaws at a rate such as to retard movement of the trailing end of the pouch which, in effect, pulls it rearwardly is produced by rotating the gears 50, 52 at a rate such that rectilinear movement of the jaws forwardly in the direction of movement is slower than the rate of forward movement of the conveyor 18. The conveyor moves at a constant speed.

The disks 25—25 are supported at the lower ends of shafts 66 and 68 provided with suitable bearings 67, 69. The bearing 69 is fixed and the bearing 67 is formed at the distal end of an arm 71 pivoted at 73 so that the disks are movable relative to each other to allow for differences in the thickness of the pouch material. A spring 75.1, FIG. 3a, supported on a spindle 77 with one end bearing against the distal end of the arm 71 and the other against an adjustable nut 79 provides for yieldably holding the disks engaged and for adjusting their resistance to yield. The shafts 66, 68 are rotated in opposite directions by means of meshing gears 70 and 72 fixed to the shafts and by meshing gears 74 and 75. The gear 76 is fixed to a shaft 78. The gear 74 meshes with a drive input gear 160 and is driven at a constant speed. In order to produce acceleration of the rotating disks there is mounted on the shaft 66, FIG. 4a, a fork 80, the tines 82—82 of which embrace an eccentric pin 84 fixed to the disk 85 fast to the shaft 78. The gear 75 and the fork 80 are each mounted to the shaft 66 by means of overriding clutches 74a and 80a respectively. The drive thus proceeds from the gear 75 and clutch 74a to shaft 66 and thence through gears 70 and 72 to the disk 25 at the lower end of the shaft 68 at the same speed as the disk 25 at the lower end of the shaft 66. The drive also proceeds through the gear 75 to 76 and from thence to the shaft 78 to the disk 85. As the disk 85 rotates the eccentric pin 84 will drive during one-half of the rotation of the disk to accelerate rotation of the shaft 66 one revolution per pouch in proportion to the radial distance of the eccentric pin from the center of the disk. During acceleration the clutch 80a provides the driving connection for the disk 85 to the shaft 66 and the clutch 74a allows the shaft to turn freely in the gear 75. During the other half of rotation of the disk 85 the clutch 80a allows the shaft to turn freely in the fork while the clutch 74a takes over the drive for the gear 75. Thus the disks 25—25 are driven at a constant speed by the drive 74 and intermittently advanced (accelerated) for every pouch by the drives 85, 80. The disk 85 contains openings 84a at different radial distances from the center of rotation into which may be secured the eccentric pin 84 to provide for the rate of advance desired.

The retarding action of the jaws and the acceleration imparted by the rotating disks as explained apply pulling forces to the open top of the pouch in opposite directions while the pouch is moving fowardly. To prepare the flattened upper edges of the pouch for heating and sealing so that they will not spread apart between the time they leave the rotating disks, pass between the heating means and arrive at the sealing means, it is desirable to stiffen these edges by crimping them transversely along a line spaced from and parallel to the extremities of the edges. This is accomplished by providing the disks 25—25 with mating concave and convex surfaces 62, 64, FIG. 10a. The creasing starts at the beginning of the straightening phase and continues without interruption until the pouch leaves the disks 25—25.

To keep the upper edge portions of the closed pouch from being pulled apart by the bulge in the pouch below the edges to be sealed there are provided belts 84—84, FIGS. 3, 4 and 6 to 10, which have spaced parallel uniformly straight runs 86—86 at opposite sides of the path of travel of the conveyor pockets which extend from the rotating disks all the way to the sealing means 14, the latter comprising a pair of coacting rolls 88—88. The coacting sealing rolls 88—88 are fixed to the lower ends of a pair of vertically mounted shafts 90–91, FIGS. 3 and 4. The shaft 91 is supported in fixed bearing on the machine frame and the shaft 90 is supported in a bearing 90a at the distal end of an arm 92, the proximal end of which is pivotally supported by a pin 94 mounted to the frame. The arm supporting the shaft 90 permits yield between the coacting rolls 88—88 to accommodate variations in thickness of the pouch material. Meshing gears 95-97 fixed to the shafts 91, 90 provide for driving them at the same speed and in opposite directions to advance the sealed edge between them. The shaft 91 has on it a gear 99 which is driven by way of gears 101 and 103 from the main drive shaft as will appear hereinafter.

The belts 84—84 are entrained about sheaves 98—98 and 100—100 secured to the lower faces of the rotating disks 25—25 and coacting sealing rolls 88—88. The belts are in the form of close coiled springs so as to provide a forward feeding force, a gripping action and to yield to accommodate to variations in thickness of the pouch material at the edges.

The sealing rolls 88—88 as will be seen by reference to FIG. 12, have smooth surfaces 102—102 which are shaped to remove the crimp imparted to the edges by the rotating disks 25—25 so as to straighten the edges simultaneously with sealing and chilling of the edges which have just previously been heated to become adhesive by the heating means 12.

Figure 3:
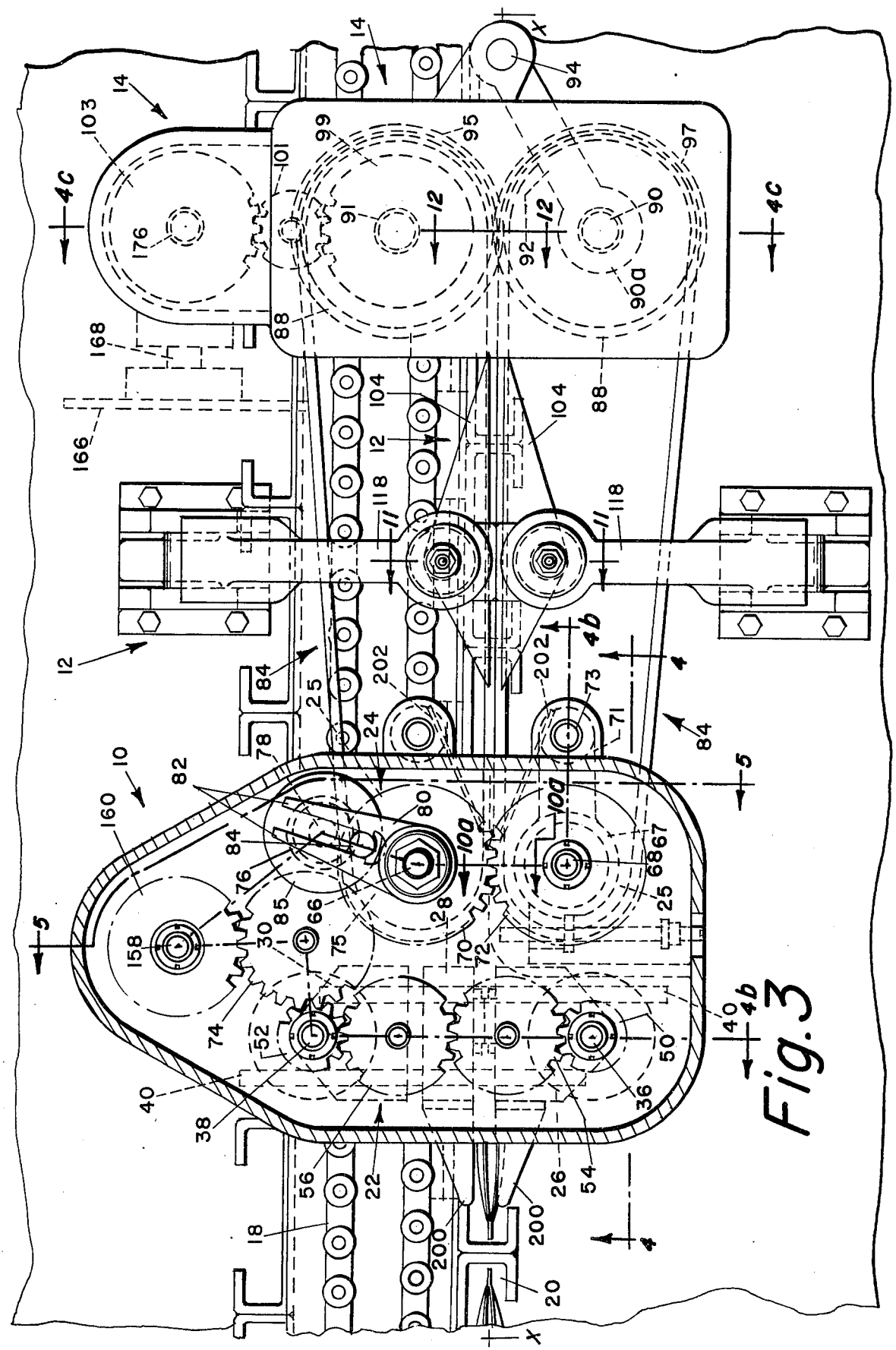
FIG. 3 is a top view to a larger scale with a part in horizontal section taken on the line 3—3 of FIG. 1.

The heating means 12, FIG. 2, for rendering the upper edge portion of the pouches adhesive comprises a pair of elongated manifold chambers 104—104, FIGS. 3 and 11, situated between the rotating disks and the coacting sealing rolls which are supplied with heated air through conductors 106—106, FIG. 2. Each manifold 104 has a vertically disposed flat face 108 parallel to the path of travel of the upper edge portion of the pouch and spaced therefrom which contains a plurality of upwardly sloping orifices 110 through which heated air is ejected toward the face of the pouch at that side and upwardly with respect thereto so that there is a flow of hot air upwardly with respect to the edge portions of the pouch above the belts, a feature which is desirable to prevent hot air from softening the bag below the belts with possible distortion of the pouch and/or damage to the belts 84—84. The face 108 may be comprised of a material known as "Dynapore" a porous material made commercially by the Michigan Dynamics Corporation, a division of AMBAC Industries Incorporated, Garden City, Mich. The material has the property of directionally orienting air as it exits from the surface. The fine pores provide a very even distribution of the air flow and at the same time permit the manifold to be mounted very close to the surface of the pouch being heated. This provides very efficient heat transfer and at the same time the flow of air tends to hold the sides of the pouch away from the hot metal surface of the manifold. As the manifold is close a tendency to stick and even scorch would exist if it was not for this air cushion effect.

Air is supplied to the conductors 106—106 through flexible pipes 112—112, FIG. 2, connected to the upper ends of the conductors from a suitable source and is heated during its passage through the conductors 106—106 by electric coils 114—114 contained with the conductors, the temperature of which are controlled by thermostats 116—116 located within the manifolds 104—104.

It is desirable to be able to move the manifolds 104—104 away from each other when not using the apparatus and/or when repairing it and so the conductors 106—106 to the lower ends of which are connected the manifolds are mounted at the upper ends of arms 118—118. FIG. 2, pivoted intermediate their ends at 120—120 on posts 122—122 rising from the base plate 16.

The lower ends 124—124 of the arms 118—118 extend through openings 126—126 in the base plate and are pivotally connected at their lower ends to the distal ends of a pair of arms 128—128, the proximal ends of which are pivotally connected to a block 130 which is arranged to be raised and lowered by a threaded screw 132. By rotating the screw 132 in a direction to raise the block 130 the arms 118—118 are pivoted toward each other about the pivot 120 and by lowering the block the arms 118—118 are pivoted away from each other about the pivot 120.

Figure 14:
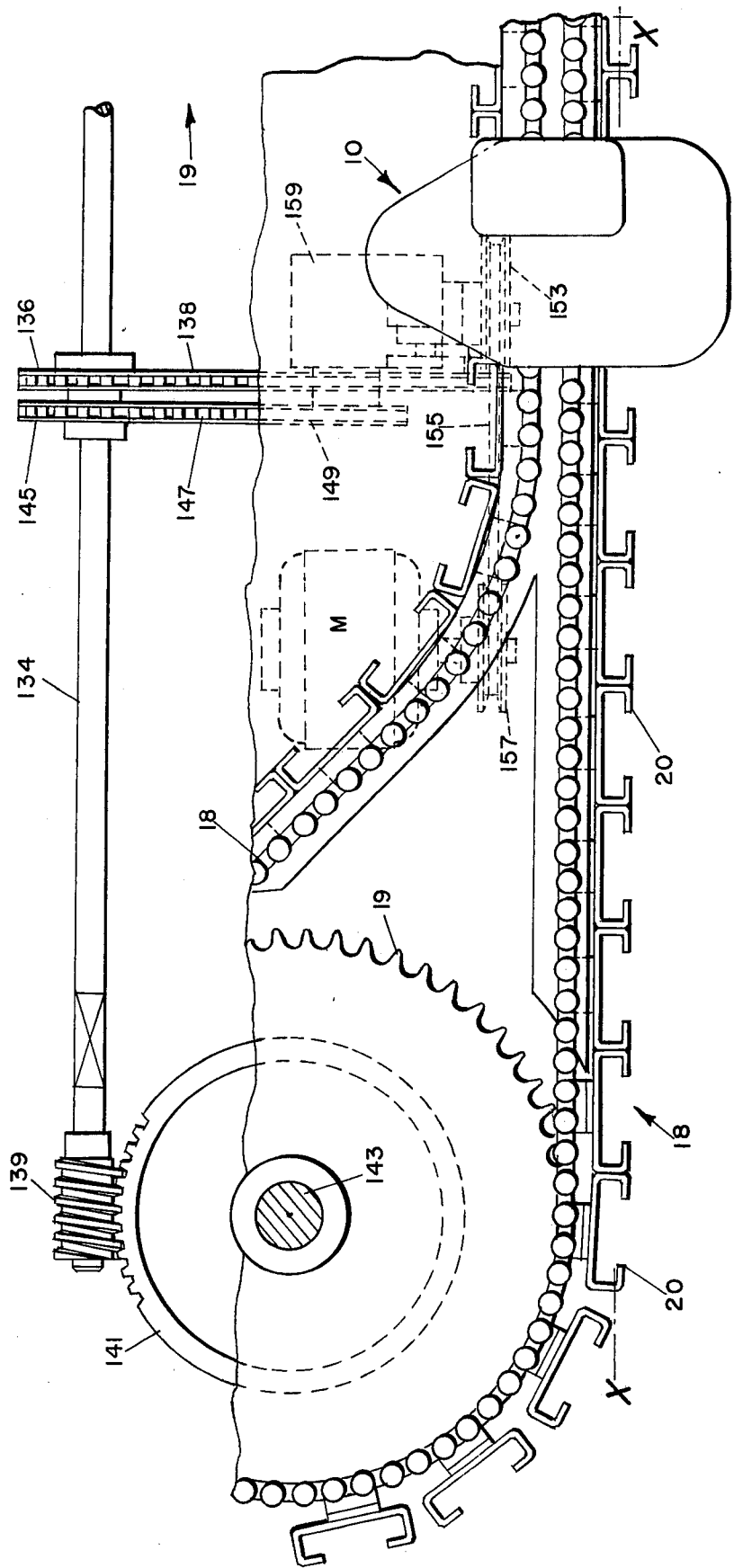
FIG. 14 is a plan view showing the drive for the conveyor.

The drive for the apparatus is provided for by a main drive shaft 134, FIGS. 2, 13 and 14, on which there are mounted drive sprockets 136, 137 and a worm 139. The drive sprocket 136 is connected by a chain 138 to a sprocket 140 fixed to a shaft 142. A sprocket 144 adjustably mounted in a slot 145 formed in a bracket 147 fixed to the under side of the base plate 16 provides for maintaining the chain at the proper tension. The shaft 142 is the input shaft of a gear reduction unit 152, FIG. 1, which has an output shaft 154 connected by a coupling 156 to the shaft 158 and the latter has on it the gear 160, FIG. 3. The gear 160 meshes with the gear 74 which in turn meshes with the gear 52 thus providing the drive for the gears 50, 52, 54, 56 and with the gear 75 which provides the drive for the gears 70 and 72.

The sprocket 137 is connected by a chain 164 to a sprocket 166 fixed to a shaft 168 of a gear reduction unit 170. An adjustable sprocket 169, like the sprocket 144, provides for keeping the chain taut. The gear reduction unit 170 has an output shaft 172 which is connected by a coupling 174 to a shaft 176. The shaft 176 has on it the gear 103.

The worm 139 meshes with a gear 141, FIG. 14, fixed to a shaft 143 which drives the conveyor sprocket 19 at one end.

The drive shaft 134 is driven by way of a sprocket 145 fixed thereto, chain 147, sprocket 149, gear reduction unit 159, pulley 153, belt 155, pulley 157 and motor M.

In order to guide the upper ends of the pouches between the jaws as they approach the straightening means there are provided guide fingers 200—200, FIG. 3, one at each side of the path of movement of the conveyor pockets which extend horizontally from the blocks 26 and 28. To keep the surfaces of the coacting gripping rolls clean there are provided scraper blades 202—202, FIG. 3, one for each of the rolls, which are supported with their edges engaged with the surface portions of the rolls moving toward them. The blades 202—202 are fixed to blocks 204, 204, FIG 2, rotatably mounted to the lower ends of shafts 206, 206 which are yieldably biased in a direction to press the blades against the coacting gripping roll.

It should be understood that the present disclosure is for the purpose of illustration only and includes all modifications or improvements which fall within the scope of the appended claims.

We claim:

1. Apparatus for closing and sealing the open tops of filled pouches traveling along a predetermined path at a predetermined speed at a predetermined spacing comprising means spaced along said predetermined path for straightening the edge portions of the pouches, rendering the straightened edge portions adhesive and squeezing the adhesived edge portions to seal the tops wherein the means for straightening the edge portions comprise longitudinally spaced clamping jaws and coacting gripping rolls arranged to simultaneously grasp the trailing and leading ends of the pouches and means for moving the clamping jaws forwardly along said path, but at a lesser speed than the pouches are moved therealong and for rotating the coacting gripping rolls at a rate such that their surfaces are traveling faster than the pouches are moving along said path.

2. Apparatus for sealing the open ends of filled pouches wherein the pouches are conveyed, open end up, along a predetermined path at a predetermined rate, clamping jaws, eccentric means mounting said jaws for movement perpendicularly into and out of engagement with the top portions of the pouches and while in engagement therewith rectilinearly along said path, coacting gripping rolls for engaging the top portions of the pouches as they travel along said path and means for continuously rotating said coacting gripping rolls, means for driving the eccentric means to bring the jaws into engagement with the trailing ends of the pouches simultaneously with the movement of the leading ends into the nip of the gripping rolls, said eccentric means moving the jaws rectilinearly along said path at a slower rate than the rate of travel of the pouches and means for accelerating rotation of the coacting gripping rolls while the jaws are engaged with the trailing ends at a faster rate than the pouches are traveling along said path.

3. Apparatus according to claim 2, wherein said eccentric means effects rectilinear movement of the jaws along a predetermined rectilinear distance and then retracts the jaws and wherein the means for accelerating rotation of the coacting gripping rolls decelerates their rotation simultaneously with the retraction of the jaws to a speed corresponding to the forward movement of the pouches along said path.

4. Apparatus for closing and sealing the open tops of filled pouches traveling along a predetermined path at a predetermined rate and at predetermined spacing comprising a pair of clamping jaws arranged along said path for movement into engagement with the trailing sides of the pouches and then forwardly in the direction of travel, a pair of coacting gripping rolls located further along said path to receive the leading ends of the pouches, said coacting gripping rolls rotating at a speed such that their surfaces travel at the samep speed as said predetermined rate of movement of the pouches, means for moving the clamping jaws into engagement with the trailing ends of the pouches simultaneously with the entrance of the leading ends into the nip of the rolls, means for reducing the speed of forward movement of the jaws to less than that of the pouches and for increasing the speed of the rolls to more than the speed of the forward movement for a predetermined interval and then disengaging the jaws and reducing the rate of rotation of the gripping rolls to a speed corresponding to the forward movement of the pouches, said jaws and said rolls during said intervals pulling the open tops of the pouches in opposite directions to straighten and flatten the edge portions thereof while the pouches continue to move forwardly along said path at said predetermined rate and means movable into engagement with the flattened edge portions of the pouches after they leave the nip of the coacting gripping rolls for pressing and sealing the edge portions to each other.

5. Apparatus according to claim 4, wherein the jaws are arranged to be moved perpendicular to the path of movement of the pouches into engagement with the opposite edges of the pouches traveling along said path and then while engaged with the edge portions forwardly parallel to the path of movement.

6. Apparatus according to claim 4, wherein the jaws are yieldingly engaged with the edge portions of the pouches.

7. Apparatus according to claim 4, comprising eccentric means supporting the jaws for orbital movement perpendicular to and parallel to the path of movement.

8. Apparatus for closing and sealing the open tops of filled pouches traveling along a predetermined path at a predetermined speed and at a predetermined spacing comprising longitudinally spaced opposing jaws and coacting rolls arranged along said path at opposite sides thereof for engagement respectively with the trailing and leading sides of the pouches, means for bringing the jaws into clamping engagement with the trailing sides simultaneously with the entrance of the leading sides into the nip of the coacting rolls, means for simultaneously moving the jaws forwardly at a slower speed than the forward movement of the pouches and for accelerating the speed and rotation of the coacting rolls so their surfaces travel at a higher rate of speed than the movement of the pouches to straighten and flatten the edge portions and means for thereafter heating the flattened edge portions and pressing them into sealing engagement.

9. Apparatus according to claim 8, wherein the coacting gripping rolls crease the flattened edge portions along a line spaced from and parallel to the extremities of said edge portions.

10. Apparatus according to claim 8, wherein the coacting gripping rolls have mating V-shaped and A-shaped peripheral surfaces which crease the edge portions parallel to the direction of travel.

11. Apparatus according to claim 8, wherein there is means for heating the edge portions situated beyond the coacting gripping rolls in the direction of travel.

12. Apparatus according to claim 8, comprising belts having opposed spaced parallel runs for engagement with the sides of the pouch above the fill as the pouch leaves the coacting gripping rolls which hold the flattened edge portions in engagement as they travel by the heating means.

13. Apparatus according to claim 8, wherein there are sealing rolls situated beyond the coacting gripping rolls for pressing the straightened and flattened edge portions together and heating means situated between the coacting gripping rolls and sealing rolls for heating the pouch material of said edge portions to a temperature such as to become adhesively united by said sealing rolls.

14. Apparatus according to claim 8, wherein there are belts provided with spaced parallel runs which extend from the coacting gripping rolls to the sealing rolls for engagement with the sides of the pouches above the contents as to hold the edge portions flat as the pouches travel from the coacting gripping rolls to the heating means and from thence to the sealing rolls.

15. Apparatus according to claim 8, wherein the coacting gripping rolls crease the edge portions parallel to the direction of travel and wherein the belts are arranged to have engagement with the sides of the pouches above the content and below the crease.

16. Apparatus according to claim 8, wherein the heating means comprise conductors arranged at opposite sides of the path of movement of the pouches for directing heated air against the side surfaces of the pouches.

17. Apparatus according to claim 8, comprising heating means at opposite sides of the path of movement of the pouches for directing a flow of hot air upwardly at an angle onto the side surfaces at the top.

18. Apparatus according to claim 8, wherein the heating means comprise closely spaced upwardly inclined passages at opposite sides of the path of travel of the pouches through which heated air is projected upwardly against the sides of the pouches.

19. Apparatus according to claim 8, comprising means for supporting the heating means for movement from operative position close to the path of movement of the pouches to an inoperative position retracted from said path of movement.

20. A method of closing and sealing the open tops of filled pouches moving along a predetermined path at a predetermined speed and at a predetermined spacing comprising at a predetermined place along said path grasping the trailing ends of the pouches at the mouths between a pair of opposed clamping jaws and moving the jaws forwardly in the direction of travel at a slower speed than the speed of the pouches moving along said path, simultaneously grasping the leading ends of the pouches at the mouths between the surfaces of coacting rotating rolls rotating at the speed of the movement of the pouches and accelerating the rotation of the coacting rolls to a speed greater than that of the movement of the pouches to straighten the edge portions grasped between the jaws and the coacting rolls, simultaneously releasing the trailing ends from the jaws and decelerating the rotation of the coacting rolls to the speed of the pouches without releasing the leading ends of the pouches so that the pouches continue to be uninterruptedly moved forwardly along said path, as the pouches leave the coacting rolls gripping its opposite sides below the edge portions to be sealed and continuing to advance the pouches at their normal speed between spaced heaters, from which heated air its ejected against the edge portions of the pouches to render them adhesive and thereafter squeezing the adhesive edge portions between coacting chilled pressing rolls rotating at the speed of the forward movement of the pouches.

21. A method according to claim 20, comprising blowing hot air upwardly and angularly against the sides of the edge portions to raise the temperature sufficiently high to cause the flattened edge portions to bond to each other when pressed into engagement.

22. A method according to claim 20, comprising holding and flattened edge portions in engagement and while holding them heating them to a bonding temperature.

23. A method according to claim 20, comprising yieldingly grasping the leading and trailing ends of the pouch.

24. A method according to claim 20, comprising creasing the top edge portions of the pouch width-wise thereof and holding the sides of the pouch together below and parallel to said crease as the pouch advances along said path for sealing the edge portions.

25. A method according to claim 20 comprising chilling and straightening the edge portions.

* * * * *